United States Patent
Strunk et al.

(10) Patent No.: US 7,353,149 B2
(45) Date of Patent: Apr. 1, 2008

(54) METHOD AND APPARATUS FOR SIMULATING DYNAMIC CONTACT OF OBJECTS

(75) Inventors: Oliver Strunk, Dublin (IE); Thomas Liss, Kranzberg (DE); Oliver Gross, Munich (DE)

(73) Assignee: Telekinesys Research Limited (IE)

( * ) Notice: Subject to any disclaimer, the term of this patent is extended or adjusted under 35 U.S.C. 154(b) by 776 days.

(21) Appl. No.: 10/128,269

(22) Filed: Apr. 24, 2002

(65) Prior Publication Data

US 2002/0161562 A1    Oct. 31, 2002

(30) Foreign Application Priority Data

Apr. 25, 2001   (EP) .................... 01650044

(51) Int. Cl.
  *G06G 7/48*   (2006.01)
(52) U.S. Cl. ......................................................... 703/7
(58) Field of Classification Search .............. 703/7
  See application file for complete search history.

(56) References Cited

U.S. PATENT DOCUMENTS

| | | | |
|---|---|---|---|
| 5,947,981 A | 9/1999 | Cosman | 606/130 |
| 6,167,145 A | 12/2000 | Foley et al. | 382/128 |
| 6,509,899 B1 | 1/2003 | Anderson | 345/473 |
| 6,714,901 B1 | 3/2004 | Cotin et al. | 703/7 |
| 6,909,431 B1 | 6/2005 | Anderson | 345/473 |
| 6,947,879 B2 | 9/2005 | Yamada et al. | 703/2 |
| 6,958,752 B2 | 10/2005 | Jennings, Jr. et al. | 345/420 |
| 2002/0180739 A1 | 12/2002 | Reynolds et al. | 345/474 |
| 2002/0183992 A1 | 12/2002 | Ayache et al. | 703/2 |
| 2003/0112281 A1 | 6/2003 | Sriram et al. | 345/619 |
| 2004/0148268 A1 | 7/2004 | Reil | 700/247 |
| 2004/0220793 A1 | 11/2004 | Hawkes et al. | 703/22 |
| 2005/0075154 A1 | 4/2005 | Bordes et al. | 463/1 |
| 2005/0075849 A1 | 4/2005 | Maher et al. | 703/2 |
| 2005/0086040 A1 | 4/2005 | Davis et al. | 703/22 |
| 2005/0162433 A1 | 7/2005 | Tonge et al. | 345/475 |
| 2005/0165873 A1 | 7/2005 | Zhang et al. | 708/446 |
| 2005/0165874 A1 | 7/2005 | Zhang et al. | 708/446 |
| 2005/0251644 A1 | 11/2005 | Maher et al. | 712/2 |
| 2006/0100835 A1 | 5/2006 | Bordes et al. | 703/3 |
| 2006/0106591 A1 | 5/2006 | Pierre et al. | 703/22 |
| 2006/0149516 A1 | 7/2006 | Bond et al. | 703/6 |

OTHER PUBLICATIONS

Sinha, Pramath Raj; Abel, Jacob M.; "A Contact Stress Model for Multifingered Grasps of Rough Objects", Feb. 1992, IEEE Transactions on Robotics and Automation, vol. 8, No. 1.*

(Continued)

*Primary Examiner*—Paul Rodriguez
*Assistant Examiner*—Russ Guill
(74) *Attorney, Agent, or Firm*—Kirkpatrick & Lockhart Preston Gates Ellis LLP

(57) ABSTRACT

Contact of rigid bodies is simulated with friction. A contact point is determined as a mid point between closest points on each body. An integrated relative velocity (IRV) vector is computed, and is minimized by applying forces to both bodies. If the IRV value exceeds a threshold the bodies are deemed to be sliding. Non-penetration constraint and friction values are determined in separate processes and the output of one is fed to the other.

7 Claims, 3 Drawing Sheets

OTHER PUBLICATIONS

Baraff, D.; "Interactive simulation of solid rigid bodies", IEEE Computer Graphics and Applications, vol. 15, Issue 3, May 1995.*

Burden, Rihard, L.; Faires, J. Douglas; "Numerical Analysis", Fourth Edition, 1989, PWS-Kent Publishing Company.*

Baraff, D.; "Analytical Methods for Dynamic Simulation of Non-Penetrating Rigid Bodies", Computer Graphics, vol. 23, No. 3, Jul. 1989.*

C. Lennerz, E. Schömer and T. Warken; "A framework for collision detection and response",☐☐11th European Simulation Symposium and Exhibition (ESS'99), 1999.*

Moreau, Jean J; Jean, Michel; "Numerical treatment of contact and friction: the contact dynamics method", The 1996 3rd Biennial Joint Conference on Engineering Systems Design and Analysis, ESDA. Part 4 (of 9); Montpellier; Fr; Jul. 1-4, 1996.*

Matthew Moore et al., "Collision Detection and Response for Computer Animation", Aug. 1988, Computer Graphics, vol. 22, No. 4, pp. 289-298.*

W. J. Stronge, "Rigid body collisions with friction", 1990, Proceedings: Mathematical and Physical Sciences, vol. 431, No. 1881, pp. 169-181.*

Yin-Tien Wang et al., "Dynamics of rigid bodies undergoing multiple frictional contacts", 1992, Proceedings of the 1992 IEEE International Conference on Robotics and Automation, pp. 2764-2769.*

David Baraff, "Coping with friction for non-penetrating rigid body simulation", 1991, Computer Graphics, vol. 25, No. 4, pp. 31-40.*

J.S. Pang, "On the convergence of a basic iterative method for the implicit complementarity problem", Jun. 1982, Journal of Optimization Theory and Applications, vol. 37, No. 2, pp. 149-162.*

Sweeney et al, Proc. of the Winter Simulation Conf., vol. Conf. 23, Modelling Physical Objects . . . , pp. 1187-1193, Dec. 8, 1991.

Mirtich, IEEE Intl. Conf. on Robotics and Automation, May 1998, Rigid Body Contact: Collision Detection, pp. 10-17.

Anitescu M., "A Fixed Time Step Approach for Multi-Body Dynamics with Contact and Friction," *International Conference on Intelligent Robots and Systems IROS 2003*, vol. 3, pp. 3725-3731, 2003.

Anitescu M., "Modeling Rigid Multi Body Dynamics with Contact and Friction," Doctoral Thesis, University of Iowa, 1997.

Anitescu, M. and Potra F., "Formulating Dynamic Multi-rigid-body Contact Problems with Friction as Solvable Linear Complementarity Problems," *Reports on Computational Mathematics*, No. 93/1996, Department of Mathematics, The University of Iowa, 1996.

Antiescu, M. and Hart, G.D., "Solving Nonconvex Problems of Multibody Dynamics with Contact and Small Friction by Successive Convex Relaxation," *Mechanics Based Design of Structures and Machines*, vol. 31, Issue 3, pp. 335-356, Jan. 2003.

Ascher, U.M. "Stabilization of Invariants of Discretized Differential Systems," *Numerical Algorithms*, vol. 14, No. 1-3, pp. 1-24, Apr. 1997.

Ascher, U.M., Chin, H., L.R. Petzold and Reich S, "Stabilization of Constrained Mechanical Systems with DAEs and Invariant Manifolds," *Numerische Mathematik*, vol. 67, No. 2, pp. 131-149, 1994.

Baraff D., "Analytical Methods for Dynamic Simulation of Non-Penetrating Rigid Bodies," *Computer Graphics*, vol. 23, No. 3, Jul. 1989.

Baraff, D., "Fast Contact Force Computation for Nonpenetrating Rigid Bodies," *SIGGRAPH 1994, Computer Graphics Proceedings*, pp. 23-34, 1994.

Baraff, D., "Non-Penetrating Rigid Body Simulation," *Eurographics 93 State of the Art Reports*, Barcelona, Sep. 6-10, 1993, Chapter 2.

Baraff, D.; "Interactive simulation of solid rigid bodies," *IEEE Computer Graphics and Applications*, vol. 15, Issue 3, May 1995.

Burden, R.L. and Faires, J.D., "Numerical Analysis," Fourth Edition, 1989, PWS-Kent Publishing Company.

Cline, M.B. "Rigid Body Simulation with Contact and Constraints," Master's thesis, University of British Columbia, Jul. 2002.

Cline, M.B. and Pai, D.K., "Post-Stabilization for Rigid Body Simulation with Contact and Constraints," *Proc. IEEE Intl. Conf. on Robotics and Automation*, 2003.

Ehmann et al., "Accelerated Proximity Queries Between Convex Polyhedra By Multi-Level Voronoi Marching," *Intelligent Robots and Systems*, 3:2101-2106, 2000.

Ehmann et al., "SWIFT: Accelerated Proximity Queries Using Multi-Level Voronoi Marching," *Technical Report: TR00-026*, University of North Carolina at Chapel Hill, 2000.

Keller H., Stolz, H., Ziegler, A. and Braunl T., "Virtual Mechanics Simulation and Animation of Rigid Body Systems: Aero," *Simulation*, vol. 65, No. 1, pp. 74-79, 1995.

Kry, P.G. and Pai D.K, "Continuous Contact Simulation for Smooth Surfaces," *ACM Transactions on Graphics*, vol. 22, Issue 1, pp. 106-129, 2003.

Kry, P.G., "Fast Contact Evolution for Piecewise Smooth Surfaces," MS Thesis, University of British Columbia, 2000.

Larsen, "Minkowski Sums and Distance Computation," 1998.

Lennerz C., Schomer E. and Warken T., "A framework for collision detection and response," $11^{th}$ *European Simulation Symposium and Exhibition* (ESS'99), 1999.

Lin, S.T. and Huang, J.N., "Stabilization of Baumgarte's Method Using the Runge-Kutta Approach," Journal of Mechanical Design, vol. 124, No. 4, pp. 633-641, 2000.

Mirtich, B., "Rigid Body Contact: Collision Detection to Force Computation," *Techical Report TR-98-01*, Mitsubishi Electrical Research Laboratory, 1998.

Mirtich, B.V., "Impulse-based Dynamic Simulation of Rigid Body Systems," Doctoral Thesis, University of California at Berkeley, 1996.

Mirtich, B.V., "Timewarp Rigid Body Simulation," *Proceedings of the $27^{th}$ International Conference on Computer Graphics and Interactive Techniques*, pp. 193-200, 2000.

Moreau, J.J.; Jean, M.; "Numerical treatment of contact and friction: the contact dynamics method," *the 1996 $3^{rd}$ Biennial Joint Conference on Engineering Systems Design and Analysis*, ESDA, Part 4 (of 9); Montpellier; Fr; Jul. 1-4, 1996.

Pai, D.K., Ascher, U.M. and Kry, P.G., "Forward Dynamics Algorithms for Multibody Chains and Contact," *International Conference on Robotics and Automation*, ICRA 2000, vol. 1, pp. 857-863.

Plante, E., Cani, M.-P., and Poulin P., "A Layered Wisp Model for Simulating Interactions inside Long Hair," *Eurographics Workshop on Computer Animation and Simulation*, pp. 139-148, 2001.

Sauer J. and Schoemer, E. "A Constraint-Based Approach to Rigid Body Dynamics for Virtual Reality Applications," *ACM Symposium on Virtual reality Software and Technology*, pp. 153-162, 1998.

Sinha, P.R. and Abel, J.M., "A Contact Stress Model for Multifingered Grasps of Rough Objects," *IEEE Transactions on Robotics and Automation*, vol. 8, No. 1, Feb. 1992.

Stewart, D. "Convergence of a Time-Stepping Scheme For Rigid Body Dynamics And Resolution Of Painlevé's Problem Summary," *Archive for Rational Mechanics and Analysis*, vol. 145, No. 3, pp. 215-260, 1998.

Stewart, D.E. and Trinkle J.C., "Dynamics, Friction, And Complementarity Problems," *Proceedings of the International Conference on Complementarity Problems*, Philadelphia PA, 1996, pp. 425-439.

Sweeney et al., "Modelling Physical Objects for Simulation," *Proc. of the Winter Simulation Conference*, vol. Conf. 23, pp. 1187-1193, Dec. 8, 1991.

Trinkle, J. Pang, J.S., Sudarsky, S., and Lo G., "On Dynamic Multi-Rigid-Body Contact Problems with Coulomb Friction," *Technical Report TR95-003*, Texas A&M University, 1995.

van den Bergen, G., "A Fast and Robust GJK Implementation for Collision Detection of Convex Objects," *Journal of Graphic Tools*, 4:7-25, 1999.

van den Bergen, G., "Efficient Collision Detection of Complex Deformable Models using AABB Trees," *Journal of Graphic Tools*, 2:1-13, 1998.

He, T. and Kaufman A, "Collision Detection for Volumetric Objects," *IEEE* pp. 27-34, 0-8186-8262-0/97.

Delingette, H., "Toward Realistic Soft-Tissue Modeling in Medical Simulation," Proceedings of the IEEE, vol. 86, No. 3, pp. 512-523, Mar. 1998.

van den Bergen, G., "Proximity Queries and Penetration Depth Computation on 3D Game Objects," *Technology*, pp. 125-131, 1996.

He, T. and Kaufman A, "Collision Detection for Volumetric Objects," *IEEE* pp. 27-34, 0-8186-8262-0/97, 1997.

* cited by examiner

METHOD AND APPARATUS FOR SIMULATING DYNAMIC CONTACT OF OBJECTS

INTRODUCTION

The invention relates to simulation of contact between bodies for applications such as graphics animation.

With the improvement in performance of computers in recent years, it is now possible to draw virtual 3D worlds with a reasonable amount of detail on conventional PCs in realtime. To add even more realism to these virtual worlds, interactive physical simulation can add a lifelike experience when virtually touching and pushing objects.

In order to be able to interactively simulate several rigid body objects like chairs, tables, or boxes in real time, the physical simulation normally is based on a simplified model of the virtual world. One common simplification is called rigid body simulation. That means the shape or surfaces of all objects (or rigid bodies) in the virtual world do not change during simulation and only a few properties and modules are needed to describe and perform this rigid body simulation.

Objects have the following static properties (which do not change during the physical simulation):
  Mass
  A centre of mass
  An inertia tensor
  A surface, which is normally defined by a set of geometric primitives such as spheres, polygons, etc. In a rigid body simulation these surfaces are rigid.
Rigid bodies have dynamic properties such as:
  Position
  Orientation
  Velocity
  Angular velocity
  Force and torque accumulators: The sum of all forces and torques applied to this object. In the case where the physics engine is using an Euler integrator (including but not limited to a semi implicit Euler integrator) and the time between two physics timesteps is known, these forces and torques can be easily converted to impulses (and vice versa) and these impulses can be converted into extra velocities and angular velocities. This is quite useful whenever semi-implicit integrated penalty algorithms are run sequentially.

An important aspect of physical simulation is in preventing objects from simultaneously occupying the same space at the same time, known as object penetration, requiring the calculation of non-penetration constraint forces to keep objects apart during collisions. Another important aspect is the simulation of friction which acts to retard the relative motion of objects in contact and which is necessary for the implementation of stable stacks of objects (groups of objects in contact but not moving held in place by a combination of external forces, e.g. gravity, and friction forces).

At present, a problem with the simulation methods employed is that they either do not account for friction effects or, if they do, it is at the cost of a large processor overhead for executing complex algorithms to simultaneously determine both non-penetration and friction forces.

"Rigid Body Contact: Collision Detection to Force Computation", Mirtich, Biran (March 1998) presented at IEEE International Conference on Robotics and Automation, includes a summary of the previous approaches. Contact modelling for rigid body simulation includes detecting contacts and computing point forces. The task of calculating these contact forces includes calculating the forces to satisfy the non-penetrating constraints and calculating the friction forces. In the prior art all processing that determines the contact forces does so by approximation in some way. This causes errors to be introduced. These errors can be large, especially if the contact forces are determined in sequential independent processes.

"Modelling Physical Objects for Simulation", Sweeney, Paula et al, Proceedings of the Winter Simulation Conference. Phoenix Dec. 8-11, 1991, IEEE, US, December 1991 pp. 1187-1193, describes a physical attribute modeller which enables simulation of the interaction of objects. Simulation is by the design and manipulation of objects with intrinsic dynamic properties—stiffness, mass and angular momentum. Attributes are assigned to the object as a whole, such as the co-efficient of friction.

The invention is directed towards providing an improved system and method for simulating dynamic contact of objects.

STATEMENTS OF INVENTION

According to the invention, there is provided a method carried out by a simulator for simulating contact of rigid body objects, at discrete intervals of time, the method comprising the steps of:
  determining non-penetration constraint and friction values in separate processes, and
  feeding back the output of each process as an input to the other process.

In one embodiment, fed back inputs are a new dynamic property for each contact point outputted by the non-penetration constraint process, and a force value required for non-penetration outputted by the friction process.

In another embodiment, the non-penetration constraint process is executed after the friction process.

In a further embodiment, the values from both processes are fed to an integrator which moves the simulation forward by a time step.

In one embodiment, the force values from the non-penetration constraint process from the previous time step are stored and fed forward to the friction process in the next time step.

In another embodiment, a value of an integrated relative velocity vector is maintained throughout simulation, with a zero value at the initial point of contact.

In a further embodiment, the friction process calculates a force required to reduce or eliminate errors accumulated in the integrated relative velocity vector.

In one embodiment, the simulator determines that there is sliding if said force exceeds a threshold.

In another embodiment, if the simulator determines that there is sliding it does not determine restoring force values.

In another embodiment, if the simulator breaks contact and determines a new contact point it sets the integrated relative velocity vector to zero.

In another embodiment, the friction process is executed for each of a plurality of subsets of contact points.

According to another aspect, the invention provides a simulator comprising means for performing a method as defined above.

DETAILED DESCRIPTION OF THE INVENTION

The invention will be more clearly understood from the following description of some embodiments thereof, given by way of example only with reference to the accompanying drawings, in which.

A computer, such as a conventional PC, is programmed as a simulator to simulate contact of bodies with a realistic friction effect. For a collision or contact, the primary inputs for simulation are:

(a) force and contact point data,
(b) object parameter values including values for mass, friction coefficient, and time step.

The simulation generates a series of force values to supersede the values (a) above.

In more detail, when the surfaces of two objects collide (or get into contact), a collision detection module translates the collision detection information into contact information. This contact information is the contact area between the two objects. In practice it is sufficient to simplify this contact area by a set of contact points, for example, a box standing on the ground has four contact points (the four vertices of the box touching the ground). Such a contact point can be described by:

A position in world space
A surface normal of the contact area which the contact points belong to.
The two objects, which are in contact.
The distance between the surfaces of the two objects at the position of the contact (if this distance is negative, then we can call it penetration depth). This distance is non-zero due to numerical accuracy of the collision detection algorithms.

The simulator simulates time by simulating only discrete timesteps. The main simulation loop is:

1. Invoke the collision detection module on all objects to update all of the contact point information.
2. Apply all external/user forces/impulses
3. Invoke a collision resolution and friction module on all colliding objects to calculate all forces necessary to get correct collision resolution and friction behaviour.
4. Invoke an integrator (for example Euler, [semi] implicit Euler, Runge-Kufta) to move the physical simulation forward in time using Newton's laws of motion and thus determine the new object states (position, orientation, velocity etc.) The delta time, which the simulation is moved forward by, is called dt.
5. Go to 1.

If several processes which apply forces or impulses to rigid bodies are run sequentially, the results of processes which are run early within the simulation loop can be partially overridden by the subsequent processes. That means that only the very last process in a simulation loop (Oust before the integration step) can actually predict the position of the objects at the next physical timestep.

The purpose of the simulator is to realistically simulate the behaviour of two touching objects. For example, a box on a hill should remain there unless the hill gets too steep.

The inputs (B) above are:
All objects with all their dynamic and static properties
All contact information.

Figure 1:
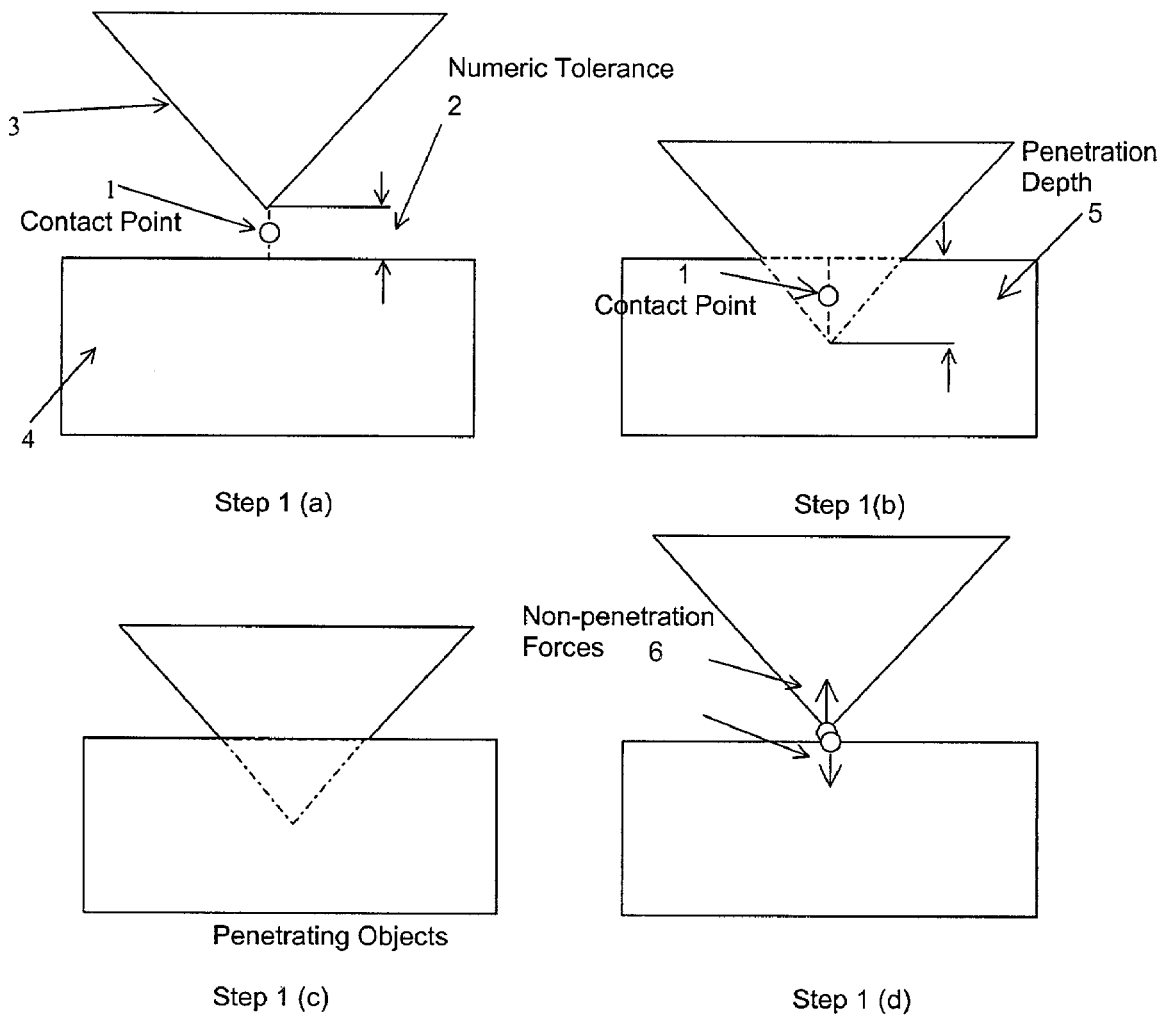
FIGS. 1 and 2 are diagrams illustrating simulation parameters.

Referring to FIG. 1, based on this input it calculates forces, which will:

Ensure that the rigid bodies 3 and 4 will not penetrate each other by looking at each contact point 1 and calculating a contact point specific force 6, which will ensure that the two objects at this point of contact are no longer moving towards each other. The direction of this force must be the direction of the surface normal.

Figure 2:
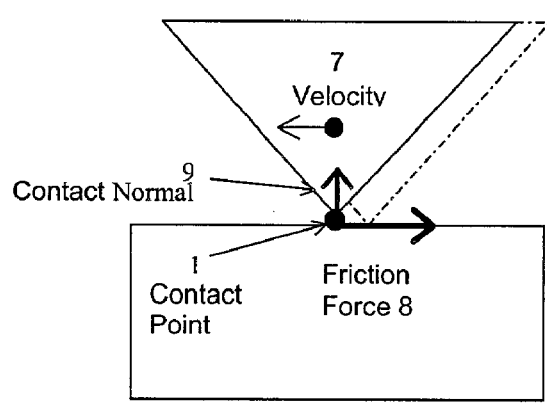

Simulate the correct friction for all contact points. Referring to FIG. 2, this can be achieved by going through all contact points 1 and trying to eliminate all relative velocities of the two involved rigid bodies at the point of contact by applying a force orthogonal to the surface normal 9. The strength of this force must not exceed a certain value depending on the friction coefficient and the forces applied in the direction of the surface normal.

In the invention, the non-penetration constraints 6 and friction values 8 are calculated separately and sequentially, in separate processes.

Figure 3:
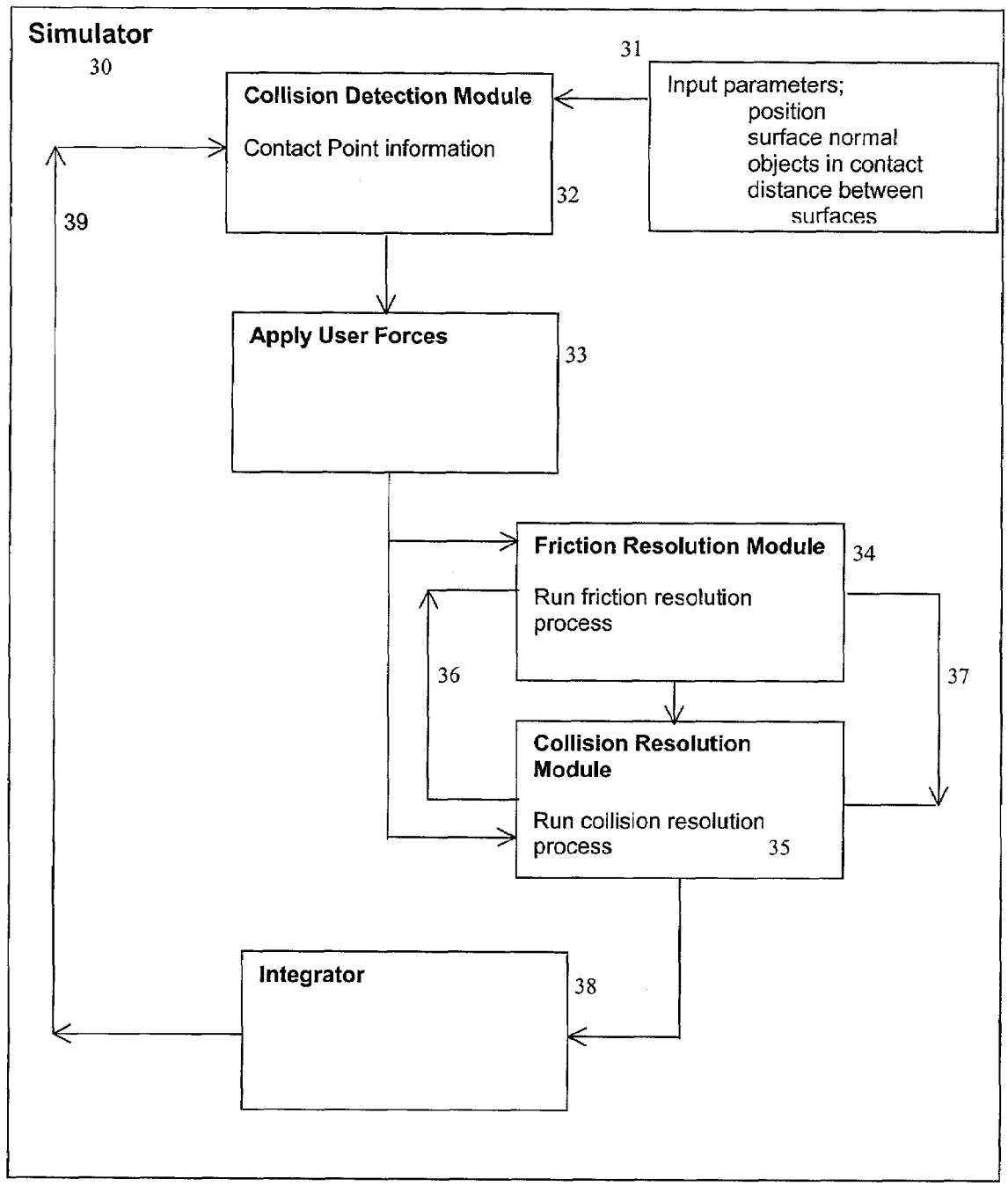
FIG. 3 is a flow diagram illustrating simulator operation.

Referring to FIG. 3 the simulator 30 comprises a collision detection module 32, a friction resolution module 34, a collision resolution module 35 and an integrator 38. A module 34 implements a friction process and a module 35 implements a collision resolution process. These modules are interconnected for feedback of the non-penetration and friction values 36, 37. The output from the friction and collision resolution modules is provided to an integrator 38.

In addition to the normal input parameters, each process receives the output of the other process as an additional input 36, 37. This additional input consists of a new dynamic property for each contact point, which is calculated by the non-penetrating process and passed to the friction process: the force which is applied by the non-penetrating process in the direction of the surface normal to keep the objects from penetrating.

This approach allows for simplification of both tasks. Therefore there is much faster non-penetration constraint force value processing. As the non-penetration constraint process is more important than the friction process it should be called as late as possible in the simulation loop, ideally just before the integrator. So there is the following simulation loop:

1. Invoke the collision detection module.
2. Apply all user forces/impulses.
3. Calculate all friction forces needed to simulate correct friction behaviour.
4. Invoke the collision resolution module without friction.
5. Invoke the integrator to move the physical simulation forward in time using Newton's laws of motion.
6. Go to 1.

In the case that there are two processes in a physical simulation say A and B which are both dependent on the output of the other process, the following occurs in many cases:

The processes A and B are simulated sequentially (first A then B) and the output of B, which is the input to A, is actually taken from the previous iteration of the simulation loop.

So for the friction and collision resolution problem there is the following simulation loop:

1. Invoke the collision detection module.
2. Apply all user forces/impulses.
3. Calculate all friction forces needed to simulate correct friction behaviour using also as an input the applied forces of the non-penetrating algorithm from the previous iteration.

4. Invoke the collision resolution module without friction and store the applied forces as a property of the contact point for use in the next iteration.
5. Invoke the integrator to move the physical simulation forward in time using Newton's laws of motion.
6. Go to 1.

To minimise errors in the friction simulation, the friction problem is formulated as follows:

Instead of eliminating the relative velocities of two objects at a point of contact, keep the length of the integrated (over time) relative velocity (IRV) of the objects at the point of contact at zero. Velocity is a 3D vector and the integrated relative velocity (IRV) is a 3D vector, where the length of a vector is a scalar.

This means that if the results of one friction algorithm call are partially overridden by other force/impulse applying processes, these errors will not be ignored but will be accumulated in the IRV vector. So during the next iteration of the simulation loop the friction process can try to reduce this IRV length. So over time the errors will not be ignored and will therefore not accumulate.

So a force is calculated which is needed to reduce the length of the IRV vector (like a standard penalty algorithm as employed by alternative methods for solving this problem). If the forces which are needed to eliminate the length of the IRV vector exceed a maximum threshold force, than the objects are deemed to be sliding and the current value of the integrated relative velocity is reduced to reflect this.

There are several ways of calculating the integrated relative velocity (IRV):
1. Approximate the IRV at the point of contact by summing up the product of the object's relative movements and the time between two simulation steps dt.
2. Calculate two reference points, one on each object's surface at the point of contact and record the positions of these relative to reference points in each object's local coordinate space. If the objects move then the distance between these two reference points is actually the IRV of the two objects at the point of contact.

To speed up the simulation of friction, the contact points are split into groups of contact points and the friction process is run on each group of contact points sequentially. This helps to speed up the simulation significantly, particularly if the size of these groups is limited to a few (or one) contact point(s). The error introduced by this approach is in many cases acceptable (and due to the use of the IRV, will not accumulate over time).

There are several ways of determining these groupings:
1. Each group has only one contact point: this very small group actually allows for very simple implementations of friction (including springs, stiff springs or other penalty based algorithms).
2. Each group has only the contact points which exist between a single pair of rigid bodies in contact.

Figure 4:
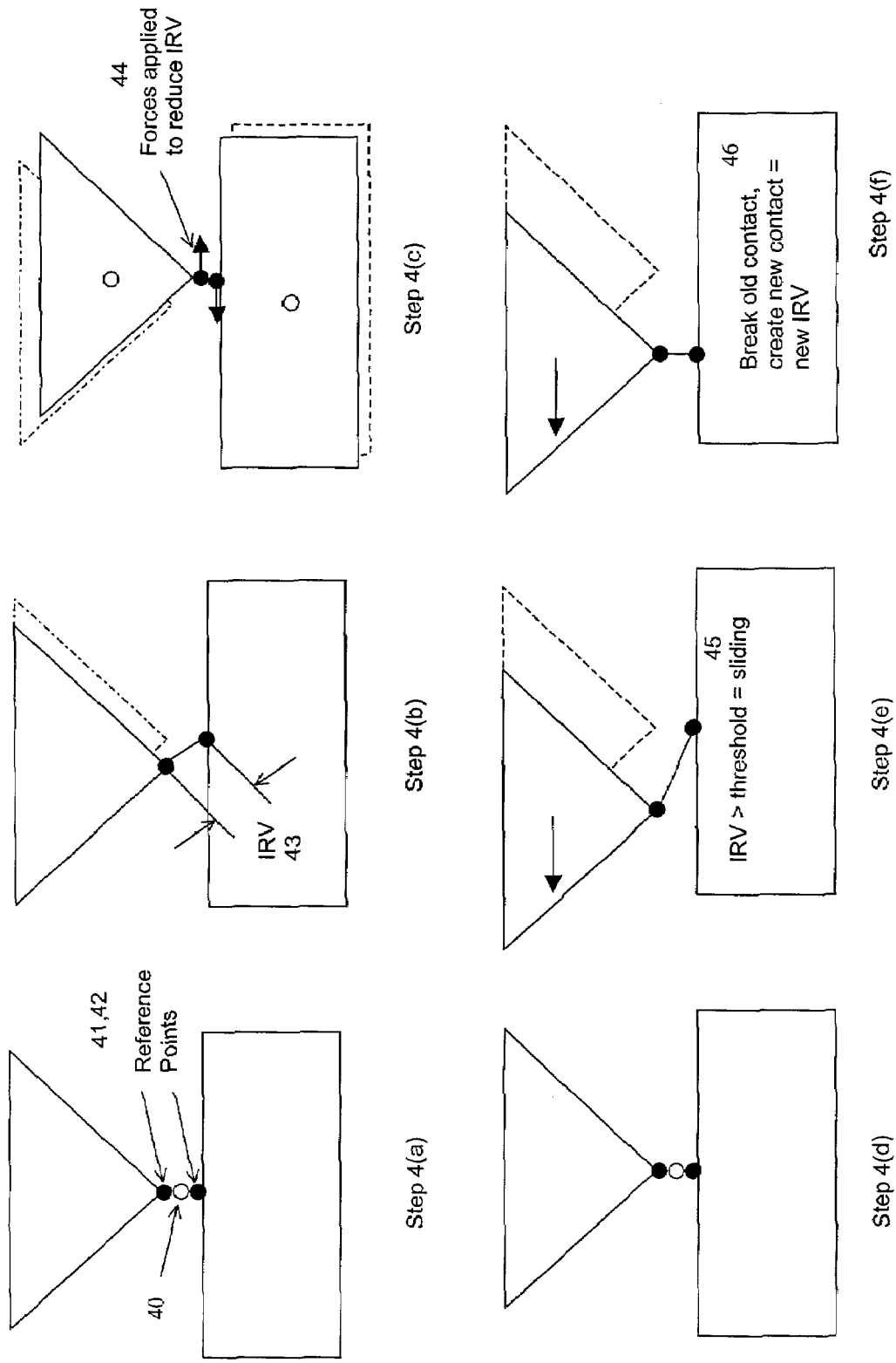
FIG. 4 is a diagram illustrating simulation.

The diagram of FIG. 4 illustrates an overview of this process, by steps 4(*a*) to 4(*f*). In a) two objects are in contact with the upper object sliding to the left with respect to the lower object. The simulator computes a contact point 40 (which due to numerical tolerance may not be on either object but is usually approximated as the point half way between the two closest points on each object). The simulator determines two reference points 41, 42 which will be the points on each object closest to the contact point 40. As the upper object slides it computes the IRV 43 (which in this case will be the distance between the reference points). The simulator proceeds to minimise the IRV by applying forces 44 to both objects, thus simulating friction. In case b) the simulator repeats this process, but this time the upper object is moving faster than before. The simulator computes the IRV which is now above a threshold 45, indicating that the objects are actually sliding. It does not compute restoring forces to reduce the IRV but instead breaks the contact 46 and recomputes a new contact point, with new reference points, and sets the IRV to zero.

It will be appreciated that in the invention the introduced error is integrated over multiple solutions as time progresses. The simulation minimises this integrated error. Also, by solving the non-penetration constraint and the friction constraint in separate steps, there can be fast and simple processing for the friction problem and simplified and more accurate processing for the non-penetration problem.

The invention is not limited to the embodiments described but may be varied in construction and detail.

The invention claimed is:

1. A method performed by a simulator of dynamically simulating contact of rigid body objects at discrete intervals of time, the method comprising the steps of:
    performing a non-penetration process determining non-penetration constraint force values and providing an output;
    performing a separate friction process determining friction force values and providing an output;
    feeding back the output of each process as an input to the other process;
    wherein for each pair of colliding rigid body objects a value of an integrated relative velocity vector calculated through an integrated relative velocity algorithm at the point of contact is maintained throughout simulation, with a zero value at the initial point of contact;
    wherein the friction process calculates a friction force required to reduce or eliminate the integrated relative velocity vector for the pair of rigid body objects;
    wherein the value of the integrated relative velocity vector increases over time as error related to the friction process accumulates; and
    wherein the output of the non-penetration process, the integrated relative velocity vector, and the output of the friction process are used to simulate the contact of the rigid body objects; and
    displaying at least one of the rigid body objects at a position in a virtual world.

2. The method as claimed of claim 1, wherein the non-penetration process is executed after the friction process.

3. The method as claimed in claim 1, wherein the values from both processes are fed to an integrator which moves the simulation forward by a time step.

4. The method as claimed in claim 3, wherein the force values from the non-penetration process from an immediately previous time step are stored and fed forward to the friction process in a next time step.

5. The method as claimed in claim 1, wherein the simulator determines that there is sliding if the integrated relative velocity vector exceeds a threshold.

6. The method as claimed in claim 1, wherein if the simulator breaks contact and determines a new contact point it sets the integrated relative velocity vector to zero.

7. The method as claimed in claim 1, wherein the friction process is executed for each of a plurality of subsets of contact points.

* * * * *